Sept. 10, 1957 A. G. SCHRAMM 2,805,867
RESILIENT WHEEL SUSPENSION AND SUPPORTING
MECHANISM FOR TANDEM TRAILER WHEELS
Filed Nov. 28, 1956 2 Sheets-Sheet 1
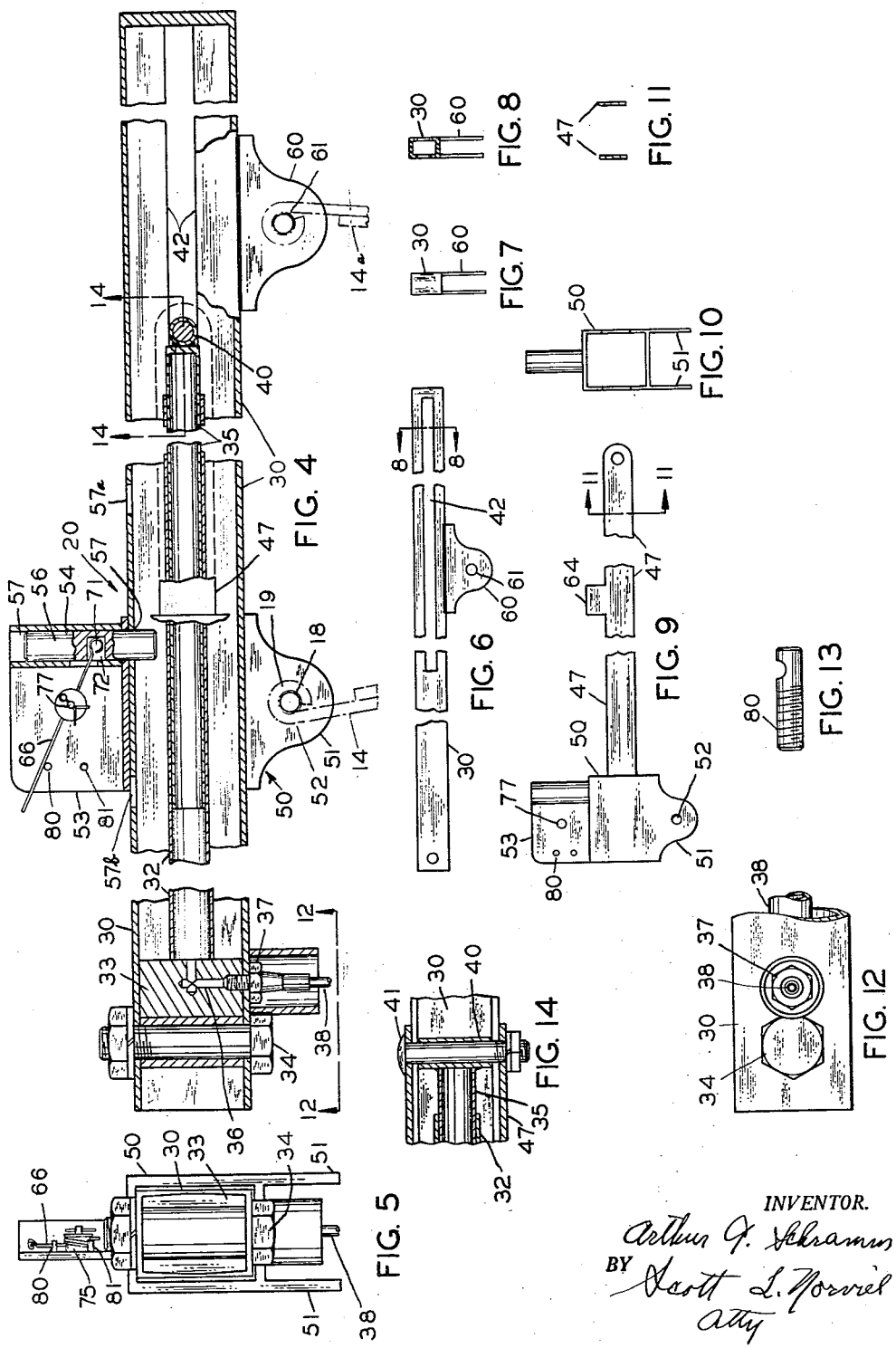
INVENTOR.
Arthur G. Schramm
BY Scott L. Norvell
Atty Sept. 10, 1957 A. G. SCHRAMM 2,805,867
RESILIENT WHEEL SUSPENSION AND SUPPORTING
MECHANISM FOR TANDEM TRAILER WHEELS
Filed Nov. 28, 1956 2 Sheets-Sheet 2

INVENTOR.
Arthur G. Schramm
BY Scott L. Norvell
atty

United States Patent Office 2,805,867
Patented Sept. 10, 1957

2,805,867

RESILIENT WHEEL SUSPENSION AND SUPPORTING MECHANISM FOR TANDEM TRAILER WHEELS

Arthur G. Schramm, Phoenix, Ariz.

Application November 28, 1956, Serial No. 624,789

3 Claims. (Cl. 280—44)

This invention pertains to tandem wheel suspension for trailers or the like.

More particularly the invention pertains to tandem wheel suspensions adapted to raise and lower a trailer bed.

One of the objects of the invention is to provide a tandem wheel suspension which is applied to both sides of a trailer bed whereby tandem wheels, one being positioned behind the other on each side of the bed, can be raised and lowered by hydraulic means so as to raise and lower the trailer bed; each tandem pair of wheels affording independent means of support for each side of the trailer bed.

Still another object is to provide tandem wheels for the support of trailers wherein each of the wheels on each side is supported on a spindle bearing on a wheel arm which is, in turn, pivotally supported on the trailer bed, and wherein a semi-elliptical leaf spring is attached to each wheel supporting arm and extends upward so that when their upper ends are joined by a fixed rigid horizontal member the wheels may be held in riding and load carrying position.

Still another object is to provide a hydraulic means for moving the upper ends of the springs attached to said wheel supporting arms to and from each other and providing means for latching the moving parts of the hydraulically operated mechanism together in various positions so that the connecting means is substantially a solid link and so that the load on the trailer is not supported by the hydraulic fluid when the trailer is in use.

Still another object is to provide a latching means to be used in connection with said hydraulic spring operating mechanism which may be controlled so that a latching bolt may be placed under tension whereby it will either latch when latching holes on the moving parts are in register or will be urged to unlatch when the strain of the weight of the trailer is removed from said latching bolt.

Other objects will appear hereinafter.

I attain the foregoing objects by means of the mechanism, parts and combination of parts shown in the accompanying drawings in which—

Figure 4 is a vertical mid sectional view of the hydraulic spring operating mechanism, drawn on an enlarged scale;

Figure 5 is an end view thereof;

Figure 6 is a side view of said hydraulic mechanism, drawn on a slightly enlarged scale;

Figure 7 is an end view thereof;

Figure 8 is a transverse section thereof taken substantially on line 8—8 of Figure 6;

Figure 9 is a side view of the slide portion of said hydraulic mechanism;

Figure 10 is an end view thereof;

Figure 11 is a section thereof taken substantially on line 11—11 of Figure 9;

Figure 12 is a view of the under side of the front end portion of the hydraulic mechanism, as shown in Figure 4 and as viewed along the line 12—12 in Figure 4;

Figure 13 is a side elevation of a tension pin;

Figure 14 is a sectional view of the pivot pitman pin connecting the slide mechanism with the hydraulic ram;

Similar numerals refer to similar parts in the several views.

Figure 1:
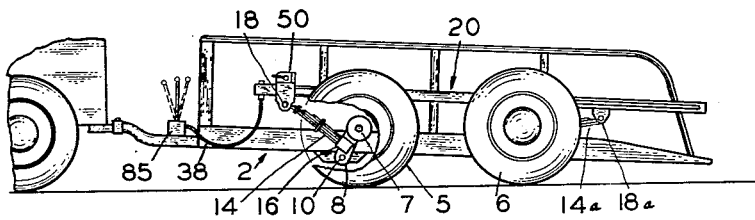
Figure 1 is a side elevation of a trailer embodying my wheel and spring suspension and raising and lowering mechanism with the wheels in running position.
Figure 2:
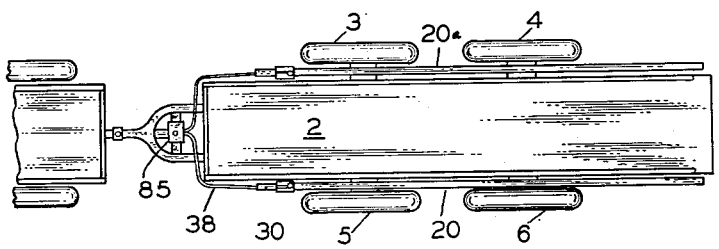
Figure 2 is a plan view thereof.
Figure 3:
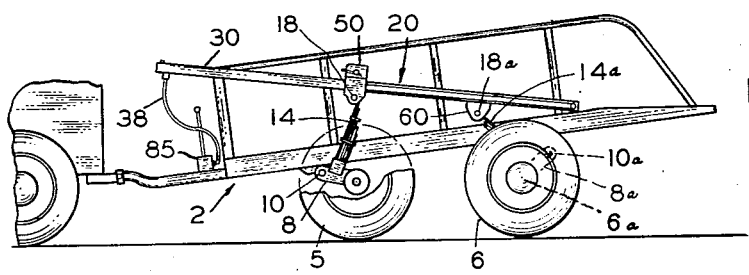
Figure 3 is a side elevation thereof when the wheels are moved to lowered position and the trailer bed is at the upper limit of its raised position.
Figures 15, 16:
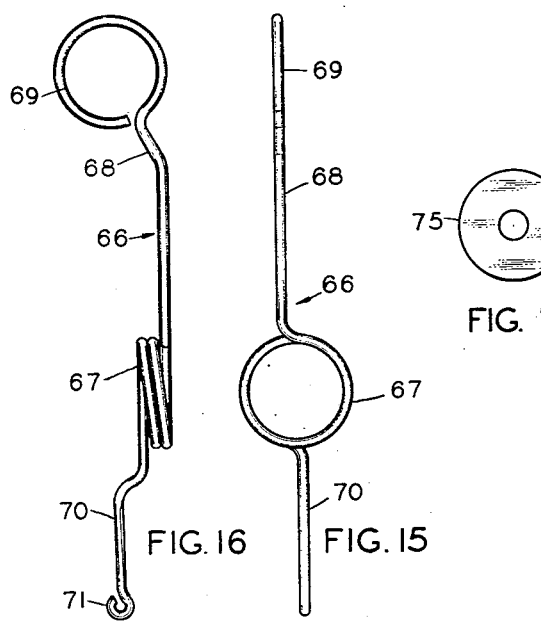
Figure 15 is a side elevation of the latching bolt spring.
Figure 16 is a front elevation of the latching bolt spring.
Figures 17, 18:
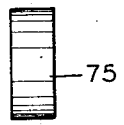
Figure 17 is a front view of the latching bolt spring bearing washer.
Figure 18 is a side view thereof.

Referring to Figures 1, 2 and 3 of the drawings it is to be noted that the trailer bed 2 is supported by four wheels 3, 4, 5 and 6. Each of these wheels is supported on a wheel spindle, such as 7, which is carried on the outer end of a pivotally mounted wheel supporting arm 8. Each of these arms is pivotally mounted on the trailer bed by a stub shaft 10. These parts are the same for each of the four wheels and are mounted so that the front wheel 5, for example, has its wheel spindle rearward of the stub shaft 10 while the rear wheel 6, for example, is positioned so that its wheel spindle is ahead of the stub shaft 10a, which supports the arm 8a on which wheel 6 is mounted.

It is to be understood that the mounting parts for the wheels 3 and 4 on the right side of the trailer bed, as viewed in Figure 2, are the right hand counter parts of the wheels 5 and 6 on the left hand side just described.

As shown particularly in Figure 1, semielliptical spring 14 is attached by box 16 to arm 8 at or near its inner end portion adjacent the shaft 10. This spring extends substantially at right angles from the arm 8 and is provided with a pivot pin 18 at its outer end. The leaves of this spring are positioned on the inner side of the main leaf, adjacent the wheel spindle 7. Conversely, the spring 14a attached to the arm 8a, on which the spindle for wheel 6 is carried, is arranged with its leaves on the forward side of the main leaf and adjacent the wheel spindle 6a. The wheel structure on the right side of bed 2 is the right hand counter part of the structure just described.

From the foregoing it will be apparent that the above described structure will raise the bed 2 when arms 8 and 8a, and their right hand counter parts on the right side of the bed, are lowered so that the wheels are forced towards the ground. This is done by drawing the upper ends of the springs towards each other as shown in Figure 3. This movement is done by links including hydraulic mechanism generally indicated by numeral 20. It is to be understood that there is a similar mechanism and arrangement of parts on each side of the trailer bed, such as indicated by numerals 20 and 20a, Figure 2.

The details of the hydraulic mechanisms 20 and 20a are shown in Figures 4 through 14 and it is to be understood that both of these hydraulic mechanisms are substantially the same. The only difference is that one is adapted to the right wheels 3 and 4 and the other is adapted to the left wheels 5 and 6.

Referring to Figure 4, numeral 30 indicates a tubular guide within which the hydraulic cylinder 32 is held and positioned by cylinder head block 33. This block, in turn, is held by vertically extending machine bolt 34. Within cylinder 32 a piston cylinder 35 operates in and out according to hydraulic pressure supplied through the duct 36 which is, in turn, connected through a fitting 37 to flexible tube 38. The operation of the piston cylinder moves the pitman 40 which is at the rear end of piston cylinder 35 and also the included transverse pitman bolt 41 which extends outward at each end through the slots 42 in the sides of tube 30. On the outside of tube 30 there are connecting links 47 through which the pitman bolt 41 extends. These links extend forward from the pitman bolt 41 to a slide, generally indicated by numeral 50, which slides along the forward end of tube 30. At the bottom of slide 50 there are lugs 51 which are provided with holes 52 to receive pins 18 which extend through bearings 19 at the upper ends of springs (such as 14) and thereby pivotally join the slide to the outer end of any of the springs such as 14. On the top side of slide 50 there is a plate 53 which is joined to a latch bolt tube 54. Latch bolt 56 slides vertically in this tube and when in the lowered latching position, as shown in Figure 4, extends through latching hole 57 and thereby latches the slide 50 to the tube 30 so that there is substantially a solid link extending between the upper ends of the springs, such as 14 and 14a, for example. There are other latching holes indicated by numerals 57a and 57b. On the rear portion of each tube 30, and attached to its bottom face, there are lugs 60 which are provided with holes 61 to receive the pins 18a which join the upper end of springs 14a pivotally to the tubular body 30.

From the foregoing it will be seen that as the slide 50 moves along the guide tube 30 toward and from the lugs 60 the upper ends of the springs 14 and 14a will be moved toward and from each other. The motion of the slide 50, as above described, is controlled by the piston tube 35 through the pitman 40 and the pitman bolt 41 and the link arms 47. It is to be observed that these links are provided with a transverse block 64 at about their middle. This keeps them aligned in parallel relationship and also keeps them from spreading when under compression.

Referring to the latch bolt 56 and its housing mechanism for urging the latch bolt to and from latching position, reference is made to Figures 4, 5, 15, 16 and 18. This includes principally a spring 66 which is provided with a helical coil 67 in its middle and with an operatng arm 68 extending upward from this coil and terminating in an eye 69 which acts as a handle. Opposite arm 68 there is a latch operating arm 70, which extends radially from the coil 67 and terminates in an eye 71. This eye extends into a cross slot 72, in bolt 56. The entire spring is made of spring wire and is supported on the bearing washer 75 which, in turn, is supported by a pin 77 on plate 53. On this plate and disposed laterally from pin 77, there are two spring positioning or tension pins 80 and 81, respectively. The arm 68 of spring 66, may be sprung outward from plate 53 and then moved parallel with the face of the plate and sprung over either one of the pins 80 or 81. As shown in Figure 4, the arm 68 is moved above pin 80 so that it rests on it. This tends to move the arm 70 downward and places a strain on latch bolt 56 so that its lower end is urged toward the face of guide tube 30. In this condition it will press on the upper surface of this tube until it reaches one of the latch bolt holes 57, 57a or 57b. When one of the latch bolt holes moves into register with the guide tube 57, in which latch bolt 56 operates, the latch bolt will descend into the latch bolt hole and securely latch slide 50 in position on the guide tube 30. The parts then form substantially a solid link between the upper ends of springs 14 and 14a. The right hand equivalent of this structure connects the springs of wheels 3 and 4.

When it is desired to unlatch the slide 50, the arm 68 is moved outward to clear pin 80 and downward until it is below pin 81 and then released so that it will bear upward against pin 81. The arm 70 of the latch bolt spring then urges the bolt 56 upward so that it will slide from latch bolt hole 57. Whenever the cramping strain between the bolt and hole 57 is released by operation of the hydraulic piston tube 35 the latch bolt 56 will immediately move upward and unlatch the slide 50.

In use, the tandem pairs of wheels on each side of bed 2 are raised or lowered by manual operation and setting of latch springs 66, and then introducing or removing oil from cylinders 32 through tubes 38. The oil may be provided by any convenient oil pump 85 mounted on bed 2. Each tandem pair of wheels may be raised or lowered, as desired.

When all wheels are lowered the trailer bed 2 is in running position and may be drawn by any convenient vehicle. When drawn over uneven terrain each wheel of each tandem pair raises and lowers according to the contours, bumps or depressions of the surface. If the forward wheel of a tandem pair is raised by a bump its attached spring flexes and this pulls the composite link 20, which is tube 30 and slide 50, and attendant parts, forward and resiliently urges wheel 6 downwardly into any depression that may be simultaneously encountered by it. Rough surfaces are thus smoothed out. Both springs are flexed and at the same time the links 20 move fore and aft according to the vertical motion of the wheels.

I claim:

1. In wheel suspension for a trailer including tandem pairs of wheels on each side of a trailer body, each wheel being supported on a spindle axle extending outward from a wheel arm pivotally supported on the trailer body at the opposite end from the wheel spindle axle; each wheel arm normally extending horizontally toward the other wheel arm to dispose said wheels in closely adjacent positions; means for resiliently springing the wheels and raising and lowering said wheels relative to the trailer bed by moving the upper ends of said springs from and toward each other, composed of leaf springs attached to each of said wheel arms on each side of said bed and normally extending upward, a guide tube pivotally attached to the upper end of one of said springs having a hydraulic cylinder within one end portion and pitman guide slots within the opposite end portion, a slide pivotally attached to the other wheel arm spring operating longitudinally on the end portion of said tube which contains the hydraulic cylinder and adapted to draw the top end of the spring attached to said slide toward and from the top end of the spring attached to said guide tube, said guide having connecting rods attached to a pitman sliding in said guide slots, a piston operating in said cylinder having a piston rod connected to said pitman, means on said trailer body for introducing and withdrawing hydraulic fluid from said cylinder to move said piston, and means on said slide for holding the slide immobile on said guide tube so that the top ends of said springs are rigidly held in spaced relation.

2. In wheel suspension for a trailer having a bed, pairs of wheel arms on each side of said bed supported on stub shafts journalled in the bed and, said arms extending toward each other, tandem pairs of wheels on each side of said body journalled on spindles on the adjacent free ends of said wheel arms, leaf springs attached at their lower ends to said wheel arms and extending upwardly therefrom, each having a bearing at its upper end; means for positioning and moving the upper ends of the springs on each pair of wheel arms toward and from each other to position and raise and lower said tandem pairs of wheels consisting of guide tubes disposed over each tandem pair of wheels and pivotally attached to the springs extending upward from the rear wheel arms, a slide operating on the free end of each of said guide tubes pivotally attached to the springs extending upward from the forward wheel arms, a hydraulic cylinder attached to the end portion of each of said guide tubes on which said slide operates and extending therein towards the opposite end of said guide tube, a piston operating in each of said cylinders having a piston rod extending toward the attached end of said guide tube and connected to a pitman, slides formed in the attached end of each of said guide tubes to slideably support said pitman and connecting arms attaching said pitman to the slide on the outside of the guide tube; means for latching said slide onto said guide tube to render said guide tube and slide relatively immobile consisting of a plate extending upward from the top of said slide, a latch guide tube extending upward from the top of said slide attached to said plate, a latch bolt slideably operating in said latch guide tube, and a spring means operating on said plate adapted to yieldably urge said latch to downward engaging position and upward disengaging position, and a plurality of latch receiving holes in the top of said guide tube adapted to receive said latch bolt when moved to registering position therewith when the bolt is yieldably urged to latching position.

3. In wheel suspension for a trailer having a bed, pairs of wheel arms on each side of said bed supported on shafts journalled in the bed and, said arms extending toward each other, tandem pairs of wheels on each side of said body journalled on spindles on the adjacent free ends of said wheel arms, springs attached at their lower ends to said wheel arms and extending upwardly therefrom, each having a bearing at its upper end; means for positioning and moving the upper ends of the springs on each pair of wheel arms toward and from each other to position and raise and lower said tandem pairs of wheels consisting of guide tubes disposed above each tandem pair of wheels and pivotally attached to the springs extending upward from the rear wheel arms, a slide operating on the free end of said guide tube pivotally attached to the springs extending upward from the forward wheel arms, a hydraulic cylinder attached to the end portion of said guide tube on which said slide operates and extending therein towards the opposite end of said guide tube, a piston operating in said cylinder having a piston rod extending toward the attached end of said guide tube and connected to a pitman, slides formed in the attached end of said guide tube to slideably support said pitman and connecting arms attaching said pitman to the slide on the outside of said guide tube, and means for latching said slide onto said guide tube to render said guide tube and slide solid and relatively immobile.

References Cited in the file of this patent

UNITED STATES PATENTS

| | | |
|---|---|---|
| 2,519,002 | Stemen | Aug. 15, 1950 |
| 2,614,863 | Schramm | Oct. 21, 1952 |